Dec. 11, 1951      T. A. LAPADURA      2,578,562
AUTOMATIC WARNING SIGNAL FOR MOTOR VEHICLES
Filed March 10, 1950      3 Sheets-Sheet 1
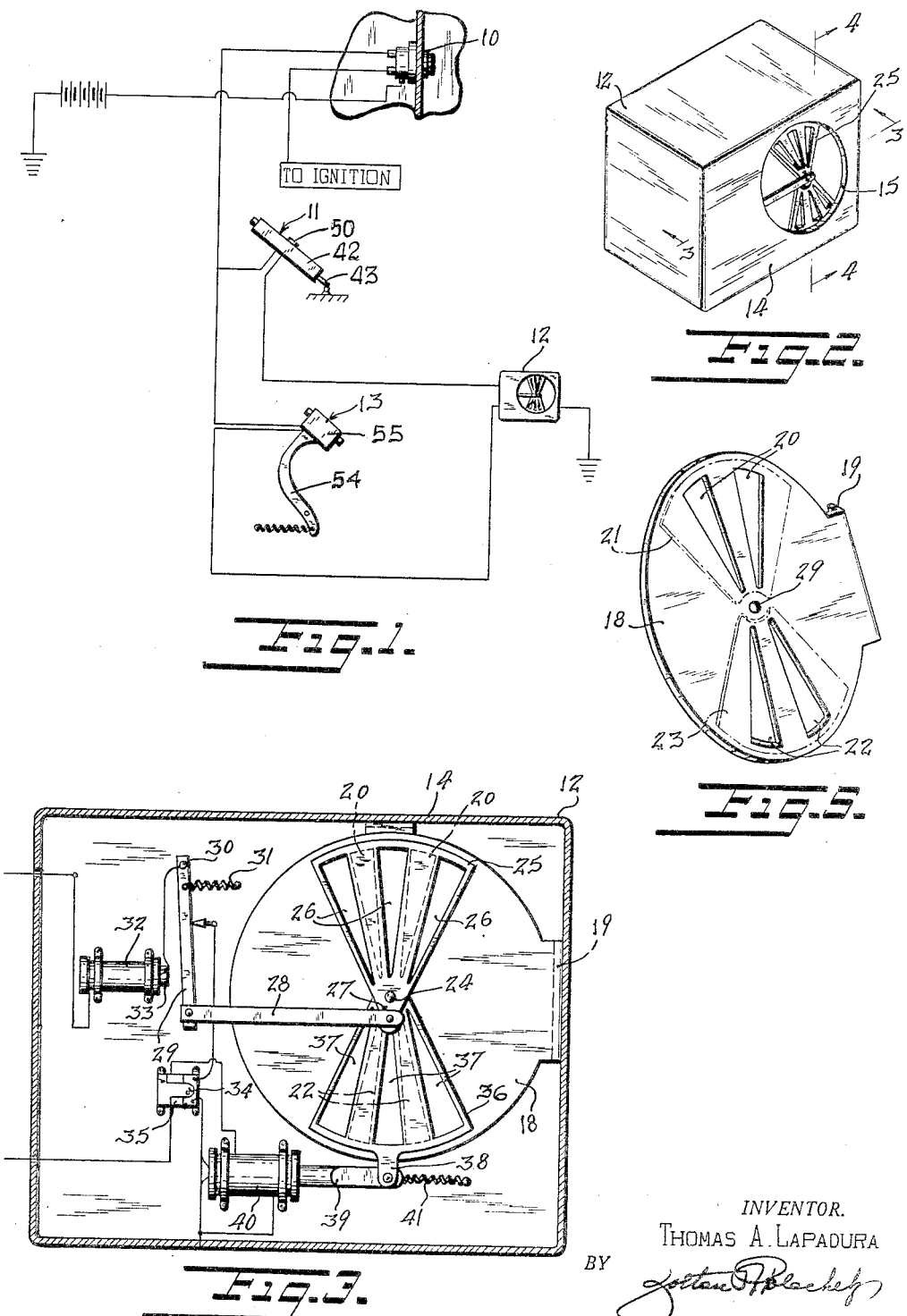
INVENTOR.
THOMAS A. LAPADURA
BY
ATTORNEY Dec. 11, 1951        T. A. LAPADURA        2,578,562
AUTOMATIC WARNING SIGNAL FOR MOTOR VEHICLES
Filed March 10, 1950        3 Sheets-Sheet 2

INVENTOR.
THOMAS A. LAPADURA
BY
ATTORNEY

Patented Dec. 11, 1951

2,578,562

UNITED STATES PATENT OFFICE 2,578,562

AUTOMATIC WARNING SIGNAL FOR MOTOR VEHICLES

Thomas A. Lapadura, Brooklyn, N. Y.

Application March 10, 1950, Serial No. 148,995

6 Claims. (Cl. 177—339)

This invention relates to signalling devices and pertains, more particularly, to means employable in vehicles for automatically warning the driver of a following vehicle of both a contemplated stop and the subsequent stop.

One object of the invention is to provide means operatively associated with the accelerator pedal of a vehicle and automatically responsive when pressure is lifted from said pedal and same is inoperative for warning a following motorist that fuel is no longer being fed to the vehicle engine and that a slow-down or stop is to be anticipated.

Another object of the present invention is to provide with means for warning a following motorist of a contemplated vehicle stop, means operatively associated with the vehicle brake pedal and whereby a stop warning signal is effected while concomitantly the contemplated stop warning means is disabled.

Another object of the present invention is to provide signalling means automatically operative upon the turning "on" of the ignition, for warning already traveling motorists that the operator of a parked and idling vehicle contemplates pulling out into traffic.

Still another object of the invention is to provide foot-operated electrical switches which may be facilitatedly attached to existing vehicle pedals and, therefore, facilitate the installation in existing automobiles of signal systems requiring operation through normal vehicle operating motions.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a schematic diagram illustrating the general arrangement of the invention.

Fig. 2 is an isometric view of the signal light.

Fig. 3 is an enlarged sectional view taken along the lines 3—3 in Fig. 2.

Fig. 6 is an isometric view of the foot-operated switch adapted for association with an accelerator pedal.

Figure 4:
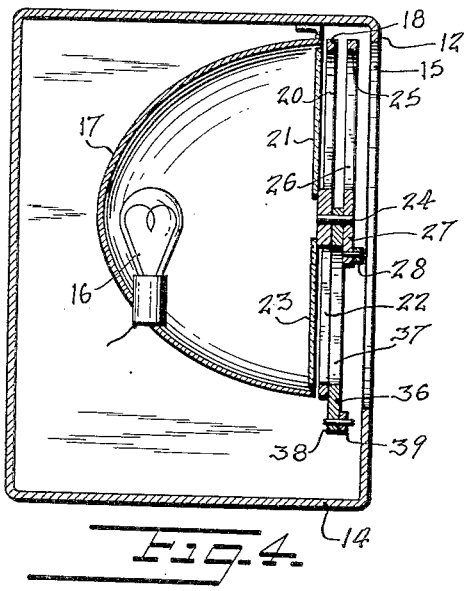
Fig. 4 is an enlarged sectional view taken along the lines 4—4 in Fig. 2.
Figure 5:
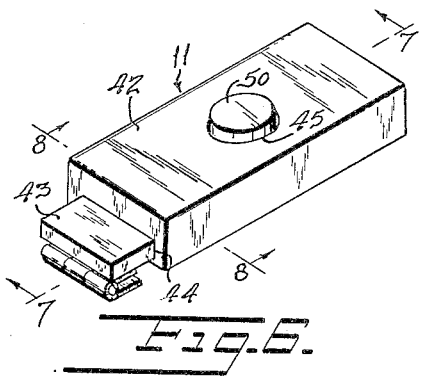
Fig. 5 is an enlarged isometric view of the light mask.

Now with reference to the drawings in more detail, and particularly to Fig. 1, it will be seen that the whole of the present arrangement is under control of an ignition switch 10. A lead wire is adapted to deliver current to a foot-operated switch 11, which will be described in more detail hereinafter. Said switch 11 is adapted for normally permitting current to pass therethrough to a signal light 12 for lighting said light and effecting an intermittent flashing of a first warning signal. Another circuit which is in parallel with that to the switch 11 is connected to a second foot-operated switch 13 which will also be described in more detail hereinafter, and is normally held open. When this circuit is closed it is effective for both disabling the means provided for effecting the said intermittent flashing of the first warning signal and for lighting a second warning signal.

The said signal light 12, see Figs. 2 to 5, includes a housing 14 having a frontal opening 15, and a lamp 16 and a reflector 17 therefor disposed fixedly in said housing and directed toward said opening.

Interposed between said reflector 17 and said housing opening 15 is a light mask 18 (Fig. 5) having a bent-over portion 19 provided for fixing the said mask to a side wall of the said housing. Said mask is provided with a pair of upper segment-like openings 20 which are covered preferably with an amber-colored lens 21 and a pair of lower segment-like openings 22 which are covered preferably with a red-colored lens 23.

Pivoted to said mask 18 at 24 is a first shutter 25 having upper segment-like openings 26 which are in staggered relation to those upper openings 20 in the said mask 18. A pendent arm 27 formed off said first shutter 25 is pivotally connected to a link 28 which itself is pivotally connected to a vibrator armature 29 pivoted at 30 to the front wall of the housing 14. Said armature is normally held in the position thereof seen in Figs. 3 and 11 by a spring 31. A vibrator coil 32 having a core 33 is also mounted on the front wall of the housing and the circuit for said coil is adapted to pass through a pair of contacts 34 on a relay 35.

Also pivoted to said mask 18 at 24 is a second shutter 36 having lower segment-like openings 37 which are in staggered relation to the lower openings 22 in the said mask 18. Pivotally connected to a pendent arm 38 formed off the said second shutter is a core 39 of a solenoid 40, also mounted on the said front wall of the housing 14. A spring 41 normally positions said second shutter to the most counterclockwise position thereof seen in Figs. 3 and 19. Included in the circuit for said solenoid 40 is the coil of the said relay 35.

Figure 8:
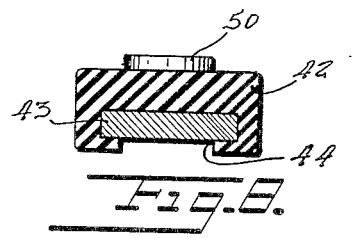
Fig. 8 is an enlarged sectional view taken along the lines 8—8 in Fig. 6.
Figure 7:
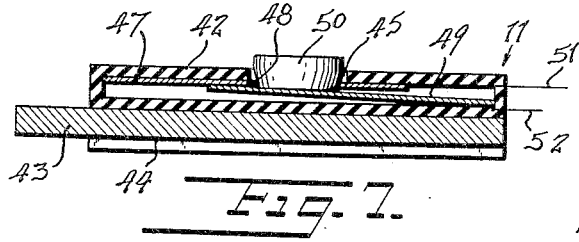
Fig. 7 is an enlarged sectional view taken along the lines 7—7 in Fig. 6.
Figure 10:
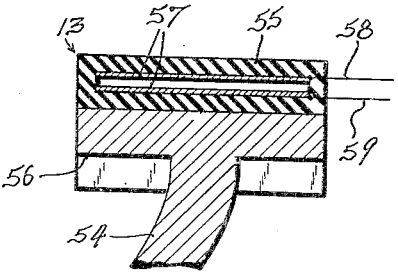
Fig. 10 is an enlarged sectional view taken along the lines 10—10 in Fig. 9.
Figure 9:
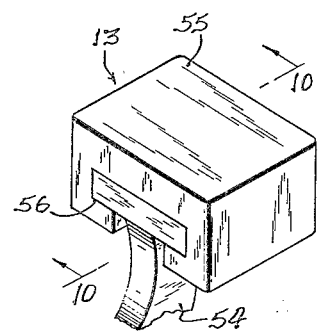
Fig. 9 is an enlarged isometric view of the foot-operated switch adapted for association with a brake pedal.

Now, with reference to Figs. 6, 7 and 8, it will be seen that the above-mentioned switch 11 is incorporated in an accelerator pedal cushion 42 which is configured for permitting the same to be fixedly fitted on an ordinary accelerator pedal 43. Said cushion 42 is preferably of rubber, although it might be of any similar insulative material, and is rabbeted longitudinally along its lower surface as at 44 in order to permit it to receive the said accelerator pedal 43 slidingly therein. Also provided in the upper surface thereof is an aperture 45.

Incorporated in said cushion 42 is a first contact 47 having an aperture 48, a second resilient contact 49 normally engaging the first contact and carrying a knob 50 thereon which passes insulatively through the aperture 48 in said first contact 47 and through the aperture 45 in the cushion 42. Wires 51 and 52 are attached to said first and second contacts 47 and 49, respectively, and lead outwardly through the said cushion 42. It will be seen that the just described arrangement is such that normally a circuit may pass through the contacts 47 and 49. However, when pressure is exerted on the said knob 50, as when gas is being fed, the contact will be flexed away from the contact 47, thereby separating the contacts and breaking the circuit. Also the relief of such pressure will cause the contacts to again complete the circuit.

The second switch 13 which is adapted to associate with an ordinary brake pedal 54 is similar to the first switch 11 in that it, too, is incorporated in a pedal cushion. In this instance a brake pedal cushion 55 is of an insulative material also and is formed with a rabbet 56 for securing the same on the said brake pedal. This arrangement, however, includes a pair of resilient contacts 57 having wires 58 and 59 attached thereto and which are normally held separated. It will be seen that contact is made and a circuit will be completed when a pressure is exerted on the upper surface of said brake pedal cushion 55 and that the circuit will be broken when the pressure is relieved.

Figure 11:
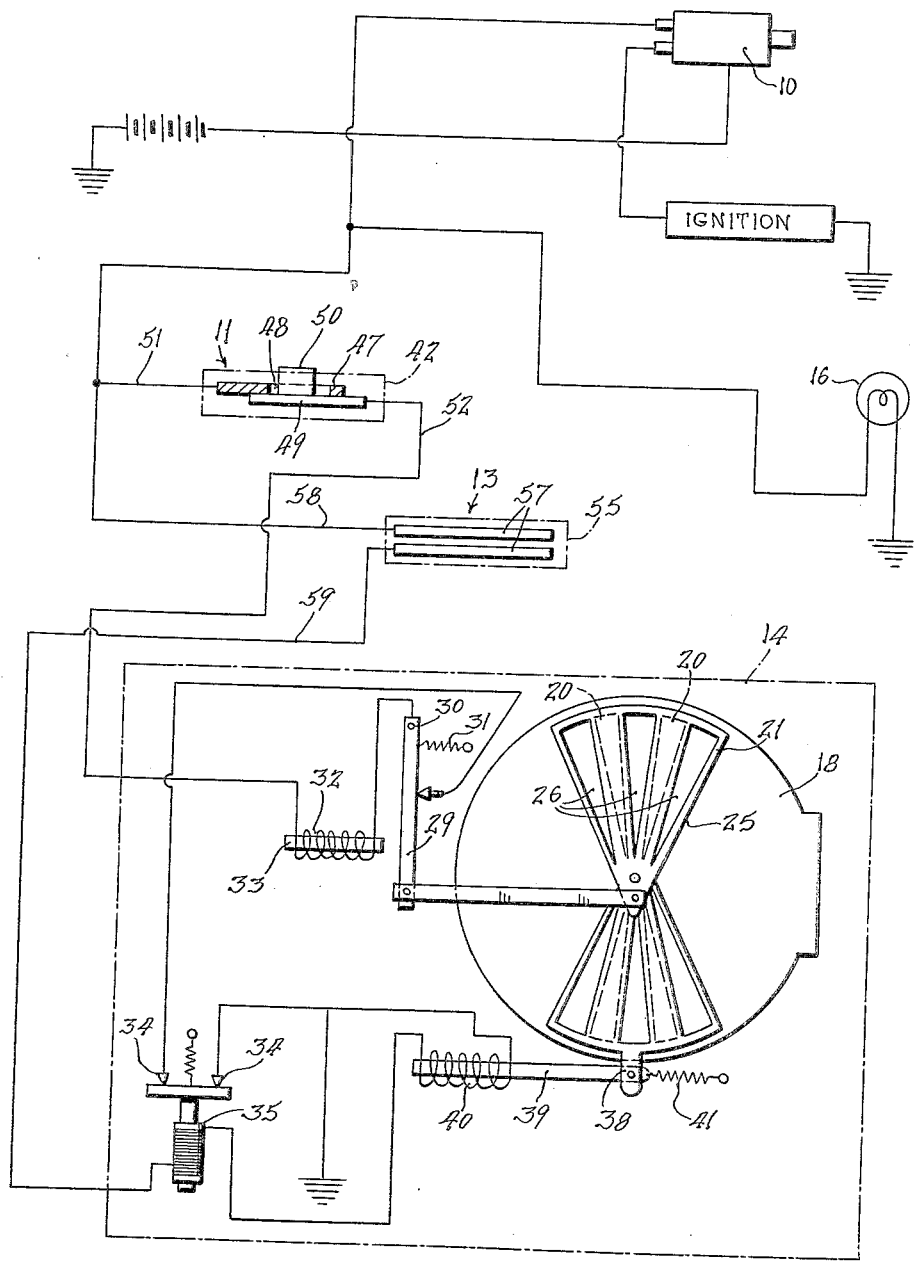
Fig. 11 is a schematic wiring diagram of the device.

In operation, the turning of the ignition switch 10 to its "on" position, see Fig. 11, causes current to pass through the normally closed switch 11 which is incorporated in the accelerator pedal cushion 42 to effect the lighting of the lamp 16 through one circuit and to energize the vibrator through a circuit passing through the normally closed contacts 34 of the relay 35. The energization of the vibrator causes the vibration of the armature 29 which in turn, through the link 28, oscillates the first shutter 25. Thusly an intermittent flashing of amber light is effected when an automobile incorporating the present invention is first started or when no pressure is being exerted on the accelerator pedal, as in contemplated stopping. In this manner a following motorist is warned that gas is no longer being fed to the engine and, therefore, to anticipate a stop.

When the stop is made by the application of pressure on the brake pedal 54 the normally separated contacts 57 incorporated in the brake pedal cushion 55 will be brought together and a circuit will be completed through the coil of the relay 35 to the solenoid 40, to thereby open the contacts 34 for breaking the circuit to the vibrator and disabling same and to actuate the second shutter 36 for thereby effecting a steady showing of a red stop warning.

Upon the release of pressure on the brake pedal and starting, the spring 41 will cause the second shutter to close and the subsequent pressure exerted on the accelerator pedal by the feeding of gas will cause the contacts in the accelerator pedal cushion 42 to be separated to disable the operation of the amber warning signal until that time when another stopping of the vehicle is contemplated.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. A warning device of the class described comprising a controllable ignition circuit, a first warning circuit normally closed when said ignition circuit is closed, a covered warning light controlled by said first circuit, means controlled by said first warning circuit for effecting an intermittent flashing of said warning light, a second ignition controlled circuit normally opened and effective when closed for uncovering said warning light and disabling said intermittent flashing means.

2. An automobile warning device of the class described comprising a controllable ignition circuit, a first warning circuit operatively associated with the accelerator pedal and closed when said ignition circuit is closed and said pedal is in its raised inoperative position, a warning light controlled by said first circuit and normally covered, means controlled by said first warning circuit for effecting an intermittent flashing of said warning light, a second ignition controlled circuit operatively associated with the brake pedal and normally opened when said pedal is in its raised inoperative position, and means effective when said brake pedal is depressed for disabling the intermittently effective flashing means and uncovering said warning light.

3. An automobile warning device of the class described comprising a controllable ignition circuit, a first warning circuit operatively associated with the accelerator pedal and normally closed when said ignition circuit is closed and said pedal is in its raised inoperative position, a warning light including a first and second lens commonly lighted by a lamp controlled by said first circuit, a first lens shutter, means controlled by said first circuit for effecting an intermittent uncovering of said first lens, a second ignition controlled circuit operatively associated with the brake pedal and normally opened when said pedal is in its raised inoperative position, a second lens shutter and means effective when said brake pedal is depressed and said second circuit is closed for disabling the means for intermittently uncovering the first lens and for uncovering the said second lens.

4. A warning device adapted for employment in vehicles including accelerator and brake pedals and a controllable ignition circuit; comprising a first circuit in parallel with said ignition circuit and operatively associated with the accelerator pedal; said first circuit being normally closed and opened when said accelerator pedal is depressed; a warning light, including a first and second lens commonly lighted by a lamp controlled by said first circuit, resiliently held closed shutters for covering said first and second lenses; means controlled by said first circuit for oscillating the shutter and thereby effecting an intermittent uncovering of said first lens; a second ignition controlled circuit operatively associated with the brake pedal and normally opened when said pedal is in its raised inoperative position; and means effective when said brake pedal is depressed and said second circuit is closed for disabling the means for oscillating the first shutter and for opening the shutter of said second lens.

5. A signaling device adapted for employment in vehicles including accelerator and brake pedals and a controllable ignition circuit; comprising a first circuit in parallel with said ignition circuit and operatively associated with the accelerator pedal; said first circuit being normally closed and adapted to be opened by the depression of said accelerator pedal; a warning light including a first and second lens commonly lighted by a lamp controlled by said first circuit, resiliently held closed shutters for covering said first and second lenses, a vibrator operatively connected to the shutter covering said first lens, a relay having the contacts thereof normally closed, a vibrator circuit in parallel with said first circuit and passing through the normally closed contacts of said relay to said vibrator, and a solenoid in series with said relay and operatively connected to the shutter of said second lens; and a second ignition controlled circuit operatively associated with the brake pedal and including said solenoid and relay therein; said second circuit being normally open when said pedal is in its raised inoperative position and closed when said pedal is depressed for opening the said vibrator circuit and concomitantly closing the solenoid circuit.

6. A signaling device adapted for employment in vehicles including accelerator and brake pedals and a controllable ignition circuit, comprising a first circuit in parallel with the ignition circuit, a switch on the accelerator pedal and including a resilient pedal cushion enclosing normally closed contacts and lead-in and lead-out wires connected to said contacts and in series in said first circuit so that depression of the accelerator pedal will open said first circuit, a warning light including a first lens and a second lens lighted by a common lamp controlled by said first circuit, a pivotally mounted shutter for each of said lenses, resilient means holding said shutters in closed positions covering their respective lens, a vibrator operatively connected to the shutter covering said first lens, a relay having normally closed contacts, a vibrator circuit in parallel with said first circuit and passing through the closed contacts of said relay to said vibrator, a solenoid in series with said relay and operatively connected to the shutter of said second lens, a second ignition controlled circuit including a normally open switch on the brake pedal, said solenoid and said relay, said normally open switch including a resilient pedal cushion mounted on said brake pedal and enclosing normally spaced contacts and lead-in and lead-out wires connected in series in said second circuit, so arranged and constructed that when said brake pedal is depressed said normally open switch carried thereby will be opened to open said first circuit de-energizing said vibrator and closing said second circuit to energize said solenoid.

THOMAS A. LAPADURA.

REFERENCES CITED

The following references are of record in the file of this patent:

UNITED STATES PATENTS

| Number | Name | Date |
|---|---|---|
| 1,525,541 | Hall | Feb. 10, 1925 |
| 1,880,849 | Damico | Oct. 4, 1932 |
| 1,911,295 | Wagner | Nov. 30, 1933 |
| 2,128,769 | Finnell | Aug. 30, 1938 |
| 2,260,680 | Nelsen | Oct. 28, 1941 |
| 2,266,201 | Heidel | Dec. 16, 1941 |